United States Patent [19]

Bedin

[11] Patent Number: 5,158,168

[45] Date of Patent: Oct. 27, 1992

[54] CONTAINER TRANSFER DEVICE

[75] Inventor: Jean Bedin, Le Bouscat, France

[73] Assignee: La Girondine S.A., France

[21] Appl. No.: 535,758

[22] Filed: Jun. 11, 1990

[30] Foreign Application Priority Data

Jun. 9, 1989 [FR] France .................. 89 07637

[51] Int. Cl.⁵ ............................................ B65G 29/00
[52] U.S. Cl. ................. 198/465.1; 198/803.01; 198/608; 198/441
[58] Field of Search ............ 198/465.1, 465.2, 803.01, 198/441, 608; 141/134, 144

[56] References Cited

U.S. PATENT DOCUMENTS

| | | | |
|---|---|---|---|
| 1,574,307 | 2/1926 | Risser | 198/803.01 |
| 3,605,381 | 9/1971 | Yoshikawa et al. | 198/441 X |
| 4,200,183 | 4/1980 | Riggs | 198/803.01 |
| 4,877,067 | 10/1989 | Shimokawa et al. | 141/144 X |
| 4,940,127 | 7/1990 | Kikuchi et al. | 198/465.1 X |

FOREIGN PATENT DOCUMENTS

| | | | |
|---|---|---|---|
| 0182708 | 5/1986 | European Pat. Off. | |
| 2322946 | 11/1974 | Fed. Rep. of Germany | 198/465.1 |
| 1591106 | 6/1970 | France | |
| 2370682 | 6/1978 | France | |
| 0040253 | 3/1983 | Japan | 198/465.1 |
| 0057949 | 2/1912 | Switzerland | 198/441 |

*Primary Examiner*—Robert P. Olszewski
*Assistant Examiner*—James R. Bidwell
*Attorney, Agent, or Firm*—Rosenman & Colin

[57] ABSTRACT

A device is disclosed for transferring containers, such as bottles, comprising an endless conveying on which the containers freely rest to be transferred successively from a feed transporter by a first indexer. A second indexer is provided for transferring the containers from said conveyor to a first processing station, the two indexer being synchronized with the movement of active members of this processing station.

8 Claims, 1 Drawing Sheet

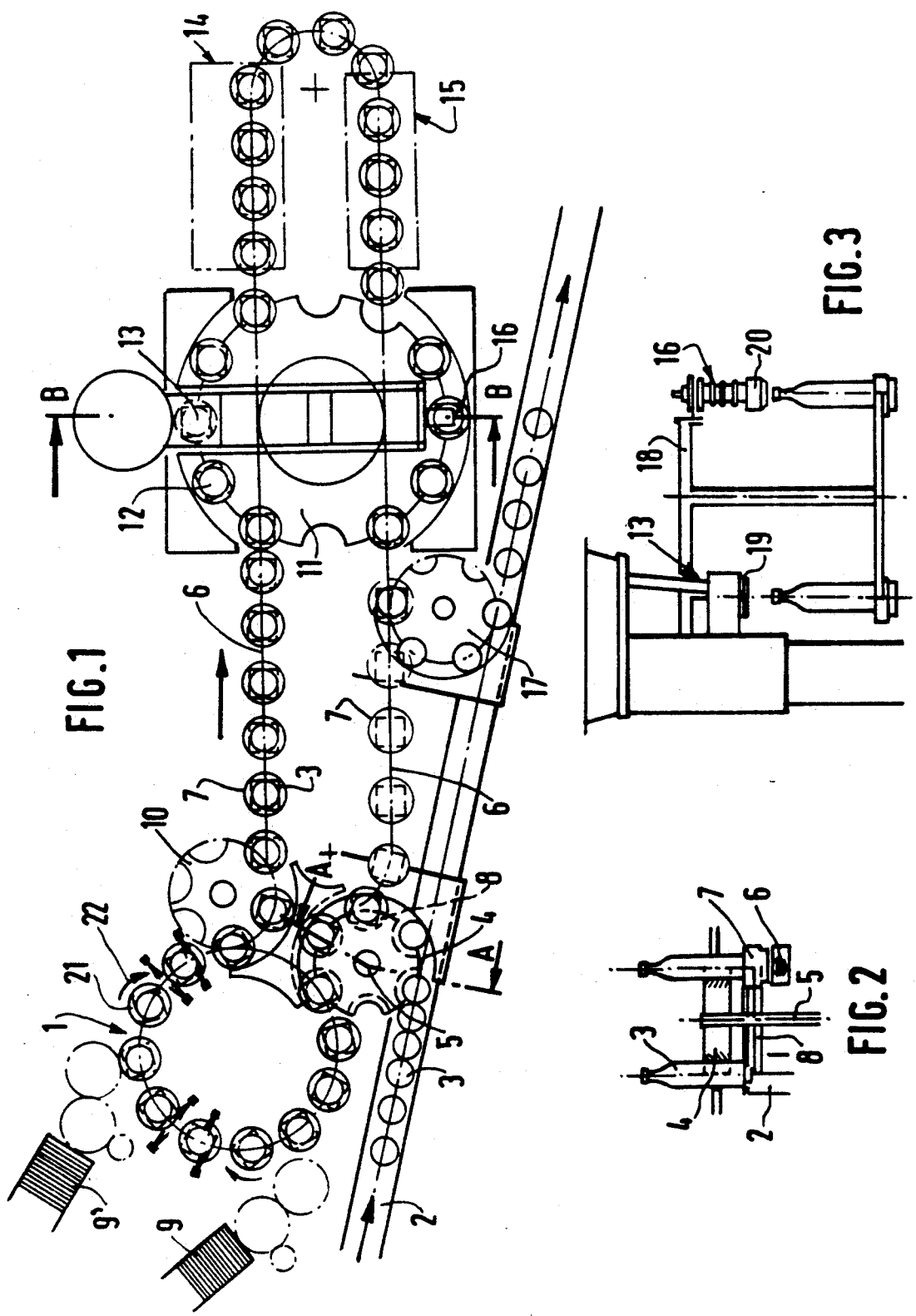

CONTAINER TRANSFER DEVICE

BACKGROUND OF THE INVENTION

The present invention relates to devices for transporting objects from one processing station to another, the operations carried out at the two stations being separate and complementary and requiring different processing times. This is the case in particular for filling and stoppering bottles.

In this field of application, in the filling station a rotary apparatus is provided having a plurality of drawing-off spouts and being driven with a continuous rotational movement, so as to avoid in particular oscillation of the liquid at the surface of the bottles, and appropriate means for transferring the containers from the filling station to a fixed stoppering station.

A device of this type is known and has been commercialized by the Etablissements Larrieu-La Girondine (France) particularly under the name of Bretagne and Anjou groups. It comprises an endless chain or transporter on which supports for the containers freely rest, which, after passing under the filling or drawing-off spouts are conveyed by the chain under the single stoppering station, occupying a fixed position and the support carrying chain being driven with a continuous movement, a raising means raises the support carrying a filled container when it passes under the stoppering means and resets it on the chain, after stoppering.

In this known device, the supports for the containers rest between pusher dogs fixed to the chain and, after stoppering, the container is set down again in the free space between the dog which pushed it and the preceding support.

In this known device the supports must be spaced apart by at least a support, i.e. the filling stations must be spaced apart by at least twice what is necessary for the single filling operation. Thus, the driving speed of the chain is twice what is required and the increase of the distance especially causes an increase of the sizes of the associated parts, for example the drawing-off tanks, so an increase in manufacturing costs.

SUMMARY OF THE INVENTION

The object of the present invention is in particular to overcome these drawbacks and it provides a device of known type, namely a device for transporting containers such as bottles, arriving on a feed conveyor, from one processing station to at least one other, and which comprises an endless conveying means, for example an endless chain or belt on which the containers freely rest, which are then led through a first processing station, then through at least a second processing station, a first means for indexing the containers being adapted so as to set the containers arriving by the feed transporter successively, one by one, down on said endless conveying means, characterized by the fact that said endless conveying means is smooth and that a second indexing means is provided adapted for bringing the containers deposited on said endless conveying means successively, one by one, to the first processing station, said first and second indexing means being synchronised with the movement of the active members of the first processing station.

For greater simplicity of the description, the endless conveying means will be designated hereafter by the name "endless chain" which is the form in which it is most often to be found.

Frequently, the containers to be processed must be oriented; this is the case in particular of bottles for operations such as labelling. In this case, for receiving the containers, supports or buckets are provided, free on the smooth chain, and the first indexing means deposits each container on a support brought by the smooth chain and the second indexing means brings said container on and with said support to the first processing station.

In the case of application to bottles, the first processing station is generally a filling, or drawing-off, station, driven with a continuous rotational movement and having a plurality of filling spouts, and the selection means are generally rotary stars, the three rotary elements, namely the filling station and the two stars, being driven in synchronism.

The first two selection stars may for example be mounted superimposed on a common shaft, driven by the mechanism controlling the first station. This could also be the same star which provides the two indexing operations.

It can be seen that the speed of the smooth chain may be chosen at will, as long however as it is at least equal to that which corresponds to the entrance pitch of the first indexing means. No precision is required for conveying the supports provided that they are sufficient in number on the chain.

When the device operates without container supports, with the containers resting directly on the smooth chain, the conveying transporter will then be adjustable in height, so as to allow the containers to pass to selection and to the first indexing means.

The invention further provides the supports or buckets with an impression, for example of a square shape, for orienting the containers, for example for labelling bottles carrying markings.

The supports or buckets may be provided with suitable reduction washers and they then have the advantage, with respect to machines in which a multiplicity of operations are provided, such as filling, stoppering, capping, labelling etc . . . , of processing containers of different dimensions, without having to change the whole indexing system of the machine.

The machine of the invention is well adapted to processing bottles, particularly bottles having to undergo, after filling, several operations such as labelling, stoppering, capping, crimping etc . . . , the different processing stations following each other as desired along the smooth chain and thus making possible an evolutive and modulable machine.

The invention even provides for associating two stations, whose processing operations are synchronised, for example stoppering and capping, or crimping, by providing one and the same control element for the processing members, for example a horizontal arm extending above the two corresponding indexing means which are synchronised and situated at two spaced apart points of the chain. Other processing stations may then be provided on the chain portion between the outlet of one of the synchronised indexing means and the inlet of the other means.

These two indexing means may further merge into a single one or be connected together by a common drive member.

BRIEF DESCRIPTION OF THE DRAWINGS

By way of example, a machine has been shown in the drawings for the multiple processing of bottles, comprising a smooth endless chain, in accordance with the invention, in which drawings :

FIG. 1 is a schematic general top view of the machine,

FIG. 2 is a schematic view in section through line A—A of FIG. 1, and

FIG. 3 is a schematic view in section through line B—B of FIG. 1.

DESCRIPTION OF THE PREFERRED EMBODIMENTS

In the example shown, the invention is applied to a combined bottle filling, labelling, levelling, stoppering and capping (or crimping) machine.

Filling, or drawing-off, takes place on a roundabout 1 (shown as an endless chain by a simple circle), driven with a continuous rotational movement, under filling spouts (not shown).

A transporter belt 2 brings the bottles 3 to the inlet of an indexing star 4 mounted for rotation on a shaft 5. On a smooth endless chain 6 buckets 7 freely rest, in any number, here very much greater than the number of spouts of the filling station 1. Under the star 4, for selecting the bottles 3, is keyed on to shaft 5 a star 8 for selecting buckets 7 brought by chain 6, the two stars 4 and 8 being synchronised with the roundabout 1 of the filling station.

Each bottle 3, selected by star 4, is deposited on a bucket 7, selected by star 8 and the bottle-on-bucket assembly is positioned under a filling spout of the roundabout 1. Labelling and counter labelling stations 9 and 9' are associated with the filling station 1. At the outlet of the filling station, a star 10 releases the buckets 7 carrying a filled and labelled bottle 3, one by one, on to chain 6.

Chain 6 then brings the bottles or buckets to an indexing star 11 which causes them to pass under a levelling station 12, then under a corking station 13. On leaving star 11, chain 6 causes the bottles, with their bucket, to pass through a cap distribution station 14, then possibly through a retraction tunnel 15 and brings them back to the inlet of the same indexing star 11. The latter then causes them to pass under a capping (or crimping) station 16.

On leaving star 11, the bottles 3, on their buckets 7, are released on to chain 6 and are brought thereby to the inlet of an indexing star 17 which brings the bottles 3 one by one on to the transporter 2 for discharging them. Buckets 7 continue their movement towards the selection star 8 and again follow the above described path.

All the known elements of the device, namely in particular, the filling roundabout, the labelling, levelling, stoppering, cap distribution, retraction, capping (or crimping) stations, the indexing stars, the transporters and the endless chain have only been shown schematically and have not been described.

It should however be mentioned that the respective active members 19 and 20 of the stoppering station 13 and of the capping (or crimping) station 16 are mounted at the end of the same horizontal shaft 18, upgoing and downgoing, thus allowing these two operations to be carried out simultaneously on two different bottles.

The buckets 7 are also provided with small square impressions 21 which permanently ensue their orientation, as shown schematically by the small arrows 22.

Buckets 7 may be provided on the inside with small reduction washers, and thus make it possible to process bottles of different diameters, every 5 mm for example, without having to change the indexing system of the device.

The smooth endless conveying means used in the embodiment shown is a continuous chain. It could be formed by two separated endless smooth belts on the respective upper strands of which the buckets rest and the ends of which are connected together by a pivoting arm transferring buckets from one chain to the other.

What is claimed is:

1. Arrangement for transporting containers along a plurality of workstations, comprising:

(a) feed means for successively supplying the containers;

(b) an endless conveying means extending through a first of the workstations and having an upper, projection-free surface for supporting the containers thereon for passage through the first workstation and, in turn, to other of the workstations;

(c) first, movable indexing means for movably transferring the containers from the feed means to the endless conveying means;

(d) second, movable indexing means in synchronism with the first indexing means, for movably transferring the containers from the endless conveying means to the first workstation; and (e) said first and second indexing means being mounted on a common shaft on the arrangement for rotation about a common axis.

2. The arrangement according to claim 1, wherein the first workstation is a filling workstation at which the containers are filled, and wherein the filling workstation includes a rotary conveyor rotatable in synchronism with the first and second indexing means above the endless conveying means.

3. The arrangement according to claim 1, wherein the endless conveying means includes a plurality of supports freely mounted thereon; and wherein the first indexing means transfers a respective container onto a respective support; and wherein the second indexing means transfers the respective container, together with the respective support therefor, to the first workstation.

4. The arrangement according to claim 3, wherein each support has means for orienting the respective container in a predetermined orientation.

5. The arrangement according to claim 1, wherein the first indexing means is elevated above the second indexing means along the common shaft.

6. The arrangement according to claim 2; and further comprising third, movable indexing means for movably transferring the containers from the endless conveying means to a pair of additional workstations, each having displaceable active members elevated above the containers in said additional workstations; and also comprising means for simultaneously displacing the active members in said additional workstations.

7. The arrangement according to claim 6, wherein said additional workstations include a corking workstation and a capping workstation.

8. The arrangement according to claim 1; and further comprising movable discharge means for successively discharging the containers from the endless conveying means, and wherein the discharge means and the feed means share a common transporter belt.

* * * * *